US012412976B1

(12) United States Patent
Parrow et al.

(10) Patent No.: US 12,412,976 B1
(45) **Date of Patent: *Sep. 9, 2025**

(54) FLEXLINE WRAP ANTENNA FOR PROJECTILE

(71) Applicant: Northrop Grumman Systems Corporation, Falls Church, VA (US)

(72) Inventors: Jacob M. Parrow, Chaska, MN (US); Christopher A. McKellips, Albertville, MN (US); Hossein Aliaghai, Plymouth, MN (US)

(73) Assignee: Northrop Grumman Systems Corporation, Fall Church, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/531,381

(22) Filed: Dec. 6, 2023

Related U.S. Application Data

(63) Continuation of application No. 18/106,707, filed on Feb. 7, 2023, now abandoned, which is a continuation (Continued)

(51) Int. Cl.
*H01Q 1/27* (2006.01)
*F42B 33/00* (2006.01)

(Continued)

(52) U.S. Cl.
CPC ............ *H01Q 1/27* (2013.01); *F42B 33/001* (2013.01); *F42B 99/00* (2013.01); *H01Q 1/36* (2013.01)

(58) Field of Classification Search
CPC ........... H01Q 1/27; H01Q 1/28; H01Q 1/285; H01Q 1/286; H01Q 1/36; F42B 15/00;

(Continued)

(56) References Cited

U.S. PATENT DOCUMENTS 2,270,314 A 1/1942 Kraus
2,939,130 A * 5/1960 Robinson, Jr. .......... F42B 12/36 343/793

(Continued)

FOREIGN PATENT DOCUMENTS

GB 2334323 A * 8/1999 ............. F42B 12/10

OTHER PUBLICATIONS

Aijaz, Zarreen et al., "Effect of the Different Shapes: Aperture Coupled Microstrip Slot Antenna", International Journal of Electronics Engineering, 2(1), 2010, pp. 103-105.

(Continued)

*Primary Examiner* — Bret Hayes
(74) *Attorney, Agent, or Firm* — Christensen, Fonder, Dardi & Herbert PLLC

(57) ABSTRACT

A projectile circuitry assembly for use in projectiles comprising a chassis defining a generally cylindrical a main body portion and further defining an interior cavity for containing one or more projectile components and further defining an antenna aperture through the body portion to expose the interior cavity. In various embodiments the projectile circuitry assembly comprises a plurality of circuit boards and a wrap antenna, the plurality of circuit boards and wrap antenna interconnected via an integrated flex-line to define a single unitary device without the use of a connector, the wrap antenna comprising one or more antenna elements defined on a flexible antenna substrate layer, wherein the plurality of circuit boards are positioned in the interior cavity and the wrap antenna is threaded through the antenna aperture and wrapped circumferentially about an exterior of the cylindrical wall of the body portion.

20 Claims, 18 Drawing Sheets

Related U.S. Application Data of application No. 16/974,169, filed on Oct. 29, 2020, now Pat. No. 11,581,632.

(60) Provisional application No. 62/973,919, filed on Nov. 1, 2019.

(51) Int. Cl.
*F42B 99/00* (2006.01)
*H01Q 1/36* (2006.01)

(58) Field of Classification Search
CPC .......... F42B 15/01; F42B 15/10; F42B 15/12; F42B 15/20; F42B 15/22; F42B 33/001; F42B 99/00
USPC .......................................... 102/501, 517, 214
See application file for complete search history.

(56) References Cited

U.S. PATENT DOCUMENTS

| | | | | |
|---|---|---|---|---|
| 3,111,080 | A | 11/1963 | French et al. | |
| 3,127,609 | A * | 3/1964 | Wentworth | H01Q 1/281 333/125 |
| 3,713,162 | A | 1/1973 | Munson et al. | |
| 3,745,583 | A | 7/1973 | Herbert | |
| 3,972,050 | A | 7/1976 | Kaloi | |
| 4,373,688 | A | 2/1983 | Topliffe | |
| 4,438,893 | A | 3/1984 | Sands et al. | |
| 4,512,537 | A | 4/1985 | Sebestyen et al. | |
| 4,537,371 | A | 8/1985 | Lawhorn et al. | |
| 4,568,039 | A | 2/1986 | Smith et al. | |
| 4,951,901 | A | 8/1990 | Dunne | |
| 5,425,514 | A | 6/1995 | Grosso | |
| 5,489,909 | A | 2/1996 | Dittmann et al. | |
| 5,696,347 | A | 12/1997 | Sebeny, Jr. et al. | |
| 5,708,446 | A | 1/1998 | Laramie | |
| 5,731,538 | A | 3/1998 | O'Brien et al. | |
| 5,734,389 | A | 3/1998 | Bruce et al. | |
| 5,788,178 | A | 8/1998 | Barrett, Jr. | |
| 6,098,547 | A | 8/2000 | West | |
| 6,133,879 | A | 10/2000 | Grangeat et al. | |
| 6,138,517 | A | 10/2000 | Laursen et al. | |
| 6,204,801 | B1 | 3/2001 | Sharka et al. | |
| 6,220,168 | B1 | 4/2001 | Woodall et al. | |
| 6,314,886 | B1 | 11/2001 | Kuhnle et al. | |
| 6,345,785 | B1 | 2/2002 | Harkins et al. | |
| 6,389,974 | B1 | 5/2002 | Foster | |
| 6,389,975 | B1 | 5/2002 | Haddon et al. | |
| 6,404,065 | B1 | 6/2002 | Choi | |
| 6,422,507 | B1 | 7/2002 | Lipeles | |
| 6,473,041 | B2 | 10/2002 | Koch et al. | |
| 6,476,481 | B2 | 11/2002 | Woodworth et al. | |
| 6,502,786 | B2 | 1/2003 | Rupert et al. | |
| 6,597,316 | B2 | 7/2003 | Rao et al. | |
| 6,615,734 | B2 | 9/2003 | Koch et al. | |
| 6,634,298 | B1 | 10/2003 | Denney | |
| 6,653,972 | B1 | 11/2003 | Krikorian et al. | |
| 6,666,402 | B2 | 12/2003 | Rupert et al. | |
| 6,693,592 | B2 | 2/2004 | Dowdle et al. | |
| 6,834,591 | B2 | 12/2004 | Rawcliffe et al. | |
| 6,966,261 | B2 | 11/2005 | Keil | |
| 6,981,672 | B2 | 1/2006 | Clancy et al. | |
| 7,020,501 | B1 | 3/2006 | Elliott et al. | |
| 7,098,841 | B2 | 8/2006 | Hager et al. | |
| 7,199,461 | B2 | 4/2007 | Son et al. | |
| 7,236,345 | B1 | 6/2007 | Roesler et al. | |
| 7,305,467 | B2 | 12/2007 | Kaiser et al. | |
| 7,355,553 | B1 | 4/2008 | Ryken, Jr. et al. | |
| 7,412,930 | B2 | 8/2008 | Smith et al. | |
| 7,431,237 | B1 | 10/2008 | Mock et al. | |
| 7,548,202 | B1 | 6/2009 | Jennings | |
| 7,631,833 | B1 | 12/2009 | Ghaleb et al. | |
| 7,681,504 | B2 | 3/2010 | Machina et al. | |
| 7,781,709 | B1 | 8/2010 | Jones et al. | |
| 7,849,797 | B2 | 12/2010 | Geswender et al. | |
| 7,849,800 | B2 | 12/2010 | Hinsdale et al. | |
| 7,947,936 | B1 | 5/2011 | Bobinchak et al. | |
| 8,063,347 | B1 | 11/2011 | Urbano et al. | |
| 8,077,099 | B1 | 12/2011 | Wesh et al. | |
| 8,091,477 | B2 | 1/2012 | Brooks et al. | |
| 8,138,982 | B1 | 3/2012 | West et al. | |
| 8,319,164 | B2 | 11/2012 | Martinez | |
| 8,324,542 | B2 | 12/2012 | Frey, Jr. | |
| 8,432,310 | B1 | 4/2013 | Pogemiller et al. | |
| 8,508,404 | B1 | 8/2013 | Wilmhoff | |
| 8,542,153 | B2 | 9/2013 | Owens | |
| 8,552,349 | B1 | 10/2013 | Alexander | |
| 8,674,277 | B2 | 3/2014 | Axford et al. | |
| 8,716,639 | B2 | 5/2014 | Mallon | |
| 8,757,064 | B2 | 6/2014 | Jennings et al. | |
| 8,812,654 | B2 | 8/2014 | Gelvin et al. | |
| 8,832,244 | B2 | 9/2014 | Gelvin et al. | |
| 8,836,503 | B2 | 9/2014 | Gelvin et al. | |
| 8,916,810 | B2 | 12/2014 | Geswender et al. | |
| 8,931,415 | B2 | 1/2015 | Volkmann | |
| 8,950,335 | B2 | 2/2015 | Stroemberg et al. | |
| 9,013,154 | B2 | 4/2015 | O'Sullivan | |
| 9,031,725 | B1 | 5/2015 | DiEsposti | |
| 9,041,172 | B1 | 5/2015 | Niu et al. | |
| 9,115,970 | B2 | 8/2015 | DeVries | |
| 9,303,964 | B2 | 4/2016 | Wuzel et al. | |
| 9,319,163 | B2 | 4/2016 | Yamaguchi et al. | |
| 9,360,286 | B2 | 6/2016 | Pettersson et al. | |
| 9,557,405 | B2 | 1/2017 | Takahashi et al. | |
| 9,587,923 | B2 | 3/2017 | Wurzel et al. | |
| 9,683,814 | B2 | 6/2017 | Dryer | |
| 9,709,372 | B2 | 7/2017 | Edwards | |
| 9,824,996 | B2 | 11/2017 | Satou et al. | |
| 10,054,404 | B2 | 8/2018 | Balk et al. | |
| 11,349,201 | B1 | 5/2022 | Parrow et al. | |
| 11,581,632 | B1 * | 2/2023 | Parrow | H01Q 1/36 |
| 2006/0061949 | A1 * | 3/2006 | Chen | G06F 1/181 361/679.02 |
| 2008/0036657 | A1 * | 2/2008 | Oomuro | H01Q 21/22 342/368 |
| 2010/0097275 | A1 * | 4/2010 | Parsche | H01Q 7/005 343/702 |
| 2018/0245895 | A1 * | 8/2018 | Malul | F42B 10/14 |
| 2019/0041527 | A1 * | 2/2019 | Gustafson | G01S 19/215 |

OTHER PUBLICATIONS

Bao, X.L. et al., "Compact Concentric Annular-Ring Patch Antenna for Triple Frequency Operation", Electronics Letters, vol. 42, No. 20, Sep. 28, 2006, 2 pages.
Carver, Keith R. et al., "Microstrip Antenna Technology", IEEE Transactions on Antennas and Propagation, vol. AP-29, No. 1, Jan. 1981, 23 pages.
Dewan, R. et al., "Improved Design of Tapering and Through Element Series Antenna", 2012 IEEE Symposium on Wireless Technology and Applications (ISWTA), Sep. 23-26, Bandung, Indonesia, pp. 202-205.
Hertlein, Robert et al., "Extended Range Guided Munition (ERGM) Safe & Arm Device and Height-of-Burst Sensor", NDIA Fuze Conference, Apr. 9, 2003, 21 pages.
Ijaz, Bilal et al., "A Series-fed Microstrip Patch Array with Interconnecting CRLH Transmission Lines for WLAN Applications", 2013 $7^{th}$ European Conference on Antennas and Propagation (EuCAP), pp. 2023-2026.
Jamaluddin, M.H. et al., "Microstrip Dipole Antenna for WLAN Application", Wireless Communication Center, Faculty of Electrical Engineering, Universiti Technologi Malaysia, 2005, pp. 30-32.
Jenn, Prof. David, "Radar Fundamentals", Naval Postgraduate School, http://www.nps.navy.mil/faculty/jenn, date unknown, 51 pages.
Jones, Bevan B. et al., "The Synthesis of Shaped Patterns with Series-Fed Microstrip Patch Arrays", IEEE Transactions on Antennas and Propagation, vol. AP-30, No. 6, Nov. 1982, pp. 1206-1212.
Kaur, Rajvir et al., "Tri-Widebank Inverted U-Slot Patch Antenna for Wireless Communication Applications", Indian Journal of Science and Technology, Vo. 10(16), Apr. 2017, 5 pages.

(56) References Cited

OTHER PUBLICATIONS

Keller, Steven D. et al., Quadirfilar Helix Antenna for Enhanced Air=to-Ground Communications, US Armey Research Laboratory, ARL-TR-79, May 2016, 34 pages.
Kraus, John D., "The Square-Corner Reflector Beam Antenna for Ultra High Frequencies", www.rfcafe.com/references/qst/square-corner-reflector-beam-antenna-qst-november-1940.htm., Nov. 1940, 4 pages.
Lee, Kai Fong at al., "A Personal Overview of the Development of Patch Antennas", The University of Mississippi, Oct. 28, 2015, 78 pages.
Mehta, Surbhi et al., "An Overview: Various Slots Shapes of Micro-Strip Patch Antenna", International Conference on Multidisciplinary Research & Practice, IJRSI, vol. I, Issue VII, date unknown, pp. 175-178.
Mishra, Pushkar et al., "Modified Concentric Rings Based Square Shaped Fractal Antenna for Wi-Fi & WiMAX Application", International Journal of Electronics Engineering Research, ISSN 0975-6450, vol. 9, No. 7, 2017, pp. 1005-1012.
Niroo-Jazi, Mahmoud et al., "A New Triple-Band Circular Ring Patch Antenna with Monopole-like Radiation Pattern Using a Hybrid Technique", IEEE Transactions, vol. 59, No. 10, Oct. 2011, pp. 3512-3517.
Patil, Sharanu et al., "Design and Implementation of a Conformal Omnidirectional Microstrip Antenna Array on Cylindrical Surface", International Journal of Advances in Electronics and Computer Science, ISSN 2393-2835, vol. 2, Issue 8, Aug. 2015, 4 pages.
Perrin, Max, "Proximity Sensor Technologies Application to New Munitions", NDIA 58$^{th}$ Annual Fuze Conference, Jul. 7-9, 2015, 19 pages.
Product Information Sheet, "Selectable Effects Munition", L-3 Mustang Technology, 2011, 2 pages.
Shoukat Saad, et al., "Design of a Dual Band Frequency Reconfigurable Patch Antenna for GSM and Wi-Fi Applications", IEEE, 2016, 5 pages.
Slade, Bill, The Basics of Quadrifilar Helix Anetnnas, www.orbanmicrowave.com, 2015, pp. 1-20.
Stephenson, B.T. et al., "Endfire Slot Antennas", IRE Transactions—Antennas and Propagation, Apr. 1955, pp. 81-86.
Yang, Wanchen et al., "A Novel 24-GHz Series-fed Patch Antenna Array for Radar System", 2016 IEEE International Workshop on Electromagnetics: Applications and Student Innovation Competition (IWEM), May 16, 2016, 3 pages.
Yuan, Tao et al., "A Novel Series-Fed Taper Antenna Array Design", IEEE Antennas and Wireless Propagation Letters, vol. 7, 2008, pp. 362-365.
Zhang, Zongtang et al., "A Circularly Polarized Multimode Patch Antenna for the Generation of Multiple Orbital Angular Momentum Modes", IEEE Antennas and Wireless Propagation Letters, vol. 16, 2017, pp. 521-524.

* cited by examiner

FLEXLINE WRAP ANTENNA FOR PROJECTILE

RELATED APPLICATIONS

The present application is a continuation of U.S. patent application Ser. No. 18/106,707, filed Feb. 7, 2023, which is a continuation of U.S. patent application Ser. No. 16/974,169, filed Oct. 29, 2020, issued as U.S. Pat. No. 11,581,632 on Feb. 14, 2023, which claims priority to U.S. Provisional Application No. 62/973,919, filed Nov. 1, 2019, the contents of which are hereby incorporated by reference in their entireties.

TECHNICAL FIELD

The present disclosure relates to antenna systems for munitions, and more specifically, to side mounted or wrapped antenna systems for munitions.

BACKGROUND

Extensive efforts have been directed toward guiding, steering, or configuring military grade projectiles for proximity sensing or seeking operations. Such projectiles greatly enhance target engagement and operational efficiencies compared to traditional projectiles. For example, in certain applications the ability to perform guided maneuvers and/or for proximity sensing may be necessary to provide a reasonable probability of engaging a target as delivery errors, environmental factors, or other issues are known to significantly degrade the effectiveness of traditional projectiles. This is particularly true when engaging moving targets, small targets, or targets that can take evasive action. In addition, capabilities can reduce collateral damage, conserve ammunition, reduces costs, minimize personnel time in engaging targets, among other benefits.

Such projectiles have included barrel-fired and non-barrel-fired projectiles, boosted, and non-boosted projectiles, and spin-stabilized and fin-stabilized projectiles. In addition, such projectiles have included, low-caliber (50 caliber or less), medium-caliber (greater than 50 caliber to 75 mm), and large caliber projectiles (greater than 75 mm and generally used as artillery, rockets, and missiles).

For example, large-caliber artillery and other projectiles, have been successfully guided—utilizing systems such as shown in U.S. Pat. No. 6,981,672, owned by the owner of the instant application. Artillery shells utilizing this type of design have been well received by the military. For example, see U.S. Pat. No. 7,412,930. These patents are incorporated herein by reference in their entireties for all purposes. Guided missiles have long been utilized for targeting aircraft and may be self-guided or remotely guided. See, for example U.S. Pat. No. 3,111,080, incorporated herein by reference in its entirety for all purposes. Such missiles are typically fin-stabilized rather than spin-stabilized, having internal propulsion systems and relying upon fins and radially-extending flaps or propulsion-directing members for altering flight path. In addition, guided missiles typically need to be launched or fired from launch tubes or brackets that are designed specific to the missile. Due to their internal propulsion systems, missiles are substantially more expensive than non-propelled projectiles.

With respect to medium and small caliber projectiles, several solutions have been proposed utilizing movable aerodynamic surfaces for steering. For example, U.S. Pat. No. 6,422,507, incorporated herein by reference in its entirety for all purposes, discloses a greater than 50 caliber projectile that may be fired from a conventional barreled gun. This projectile utilizes a spoiler that extends and retracts from a rearwardly positioned despun portion out into the air stream. The despun portion is despun by a motor and batteries provide power to the bullet.

Several solutions to guiding small-caliber projectiles, that is 50 caliber or less, have been proposed. These include firing the projectile without spinning the projectile and utilizing axially extending control fins for altering the flight. See, for example, U.S. Pat. No. 7,781,709, incorporated herein by reference in its entirety for all purposes. A notable disadvantage to such projectiles is that they cannot be fired from existing rifled barrels for conventional non-steerable projectiles and require internal batteries for operating the control circuitry and control fins which may affect the useful life of the projectile and provide a failure path. U.S. Pat. No. 5,788,178, incorporated herein by reference in its entirety for all purposes, also discloses a small-caliber bullet that is designed to be fired from a non-rifled barrel. Deployable flaps are utilized to control the flight path in the '178 device and the device requires a battery.

U.S. Pat. No. 8,716,639 discloses small to medium caliber projectiles fired through a rifled barrel that use beveled surfaces or canards on a despun nose portion operated by a motor and battery for flight control. U.S. Pat. No. 4,537,371 discloses a projectile fired through a barreled projectile that distributes air from the air stream through the projectile with valves to discharge the air laterally to change the flight path. These references are incorporated herein by reference in their entirety for all purposes. Additional prior guidance systems utilizing fins, wing-like projections, or canards have been proposed. See for example the following U.S. patents: U.S. Pat. Nos. 4,373,688; 4,438,893; 4,512,537; 4,568,039; 5,425,514; 6,314,886; 6,502,786; 7,849,800; 8,319,164. These patents are incorporated herein by reference in their entirety for all purposes.

It is generally understood in the art that fuzing, sensing, communications, proximity, and other functions are generally required for such projectiles. For example, GPS, height-of-burst (HOB), sensing, seeking, proximity detection, and other functions add capabilities for control or to enhance projectile performance to engage a target. Further improvements are always welcome for these projectiles that enhance accuracy, allow miniaturization, increase range, provide cost savings, or improve reliability.

SUMMARY

According to embodiments of the present disclosure, a flexible projectile circuitry assembly is disclosed for implementing a side-mounted or wrapped projectile antenna. In one or more embodiments, the flexible projectile circuitry assembly comprises a plurality of circuit boards and a wrap antenna, the plurality of circuit boards and wrap antenna interconnected via an integrated flex-line to define a single unitary device without the use of a connector, the wrap antenna comprising one or more antenna elements that are defined on a flexible antenna substrate layer. In various embodiments, the projectile circuitry assembly is configured for use with a projectile. In such embodiments, the projectile can comprise a nose portion with a forward tip, a body portion, a tail portion, and a chassis. In various embodiments the chassis extends from the tail portion to the nose portion and defines a generally cylindrical wall and an interior cavity within the projectile for containing one or more projectile components and further defining an antenna aperture through the cylindrical wall of the body portion exposing the interior cavity. In one or more embodiments, the plurality of circuit boards are positioned in the interior cavity and the wrap antenna is threaded through the antenna aperture and wrapped circumferentially about an exterior of the cylindrical wall of the body portion. In addition, in certain embodiments a sealing material, such as an epoxy, seals the antenna aperture.

A significant difficulty in the design of guided or smart projectiles is the implementation of side mounted or wrapped antennas onto projectiles. Such designs offer various advantages and compatibility with numerous types of projectile designs, however, with increasing environmental stresses such as high temperatures, g-force stresses, rough handling, and the like, it is difficult to successfully mount an antenna on the side of a projectile and keep the antenna in operation after firing.

As such, embodiments of the present disclosure provide an advantageous solution as compared to other implementations of side-mounted projectile antennas. For example, referring to FIG. 1, a cross-sectional front view of a projectile 100 a previously utilized implementation of a side-mounted projectile antenna. As shown, the projectile 100 has a generally cylindrical shape that includes a projectile sidewall 104. The sidewall 104 defines a projectile exterior and an interior space 108 within the projectile 100 for containing various projectile circuitry, payload, fuzing, and/or other components. Depicted in FIG. 1, the projectile 100 includes a projectile circuitry assembly 112 having an exterior wrap antenna portion 116 that is coupled with an interior antenna circuitry portion 120 via an antenna connector 124 mounted in the projectile sidewall 104. The interior antenna circuitry portion 120 includes one or more interconnected boards 122, each including various circuitry, and a connector 126 coupled with a flex-line material 128 of the one or more interconnected boards. Similarly, the wrap antenna portion 116 is comprised of one or more antenna elements defined on a flexible substrate 132. The substrate 132 is wrapped around the exterior of the projectile sidewall 104 and includes another connector 134 coupled with a flex-line material of the substrate 132. Each connector 126, 134 is soldered to be coupled with their respective flex-line material—generally requiring at least two solder joints each. In addition, to assemble the antenna portion 116 with the antenna circuitry, the connectors 126, 134 are additionally soldered to the antenna connector 124 mounted in the sidewall 104—generally requiring at least two solder joints each. Finally, the antenna connector 124 itself is soldered to the projectile sidewall 104 to mount the antenna connector 124 in place.

Furthermore, during assembly of the projectile 100, some of these solder joints or cable connections must be performed while the boards are located within the projectile 100. This requires precise manual soldering which is very difficult and expensive. In addition, the higher the frequency of the antenna, the more expensive this solution gets. For example, at higher frequencies, the connectors can get extremely expensive, as well as it is difficult to find connectors that are small enough to fit within a 20 mm or 30 mm projectile. In particular, anything beyond 6 GHz becomes very difficult to produce and solder. Along with this of course, you can have mating problems between connectors, repeatability issues, problems with the connectors or cables themselves, too much strain on the cables so that they get damaged, and the extra space it all takes up. Finally, these problems are compounded where the projectile includes more than one externally wrapped antenna.

As such, embodiments of the disclosure provide for an improved design for antenna control circuitry and antenna subsystems that eliminate the need for complicated soldering and is scalable for use in 20 mm or smaller projectiles. Also, this invention can also easily be adapted to much higher frequencies (up to and beyond 40 GHz without difficulty) with the precision of etching tolerances on circuit boards/flex-lines. The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
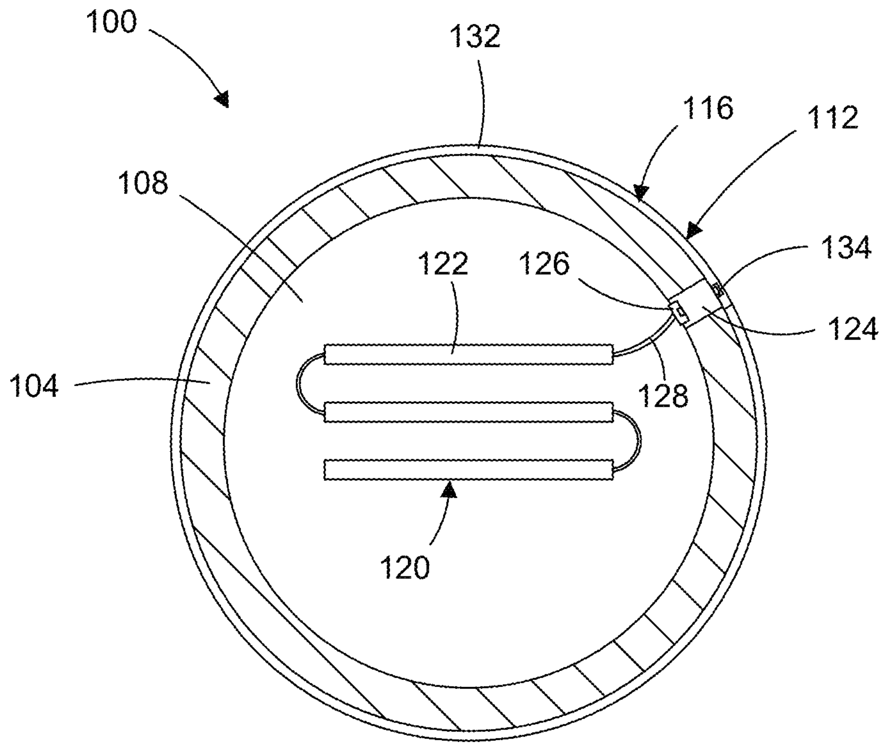
FIG. 1 PRIOR ART
FIG. 1 depicts a cross-sectional front view of a projectile that includes a previously utilized implementation of a side-mounted projectile antenna.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIGS. 2A-2E, perspective views, plan views, and partial cross-sectional views of a projectile is depicted, according to one or more embodiments of the disclosure. In various embodiments, the projectile 200 includes a main body portion 204, a tail portion 208, and a nose portion 212. A projectile sidewall or projectile chassis 214 defines at least the main body portion 204 and can additionally define the tail portion 208 and/or nose portion 212.

Described further below, the projectile 200 additionally includes a projectile circuitry assembly 216. In various embodiments the projectile circuitry assembly 216 is a collection of components configured to perform one or more various functions for the projectile 200 including, but not limited to, communication, sensing, proximity detection, and fuzing. Described further below, in various embodiments the projectile circuitry assembly 216 includes an antenna circuitry portion 218 and a wrap antenna portion 220. In one or more embodiments the antenna circuitry portion 218 includes various antenna circuitry, such as one or more transmitters and receivers, that can be used to transmit/receive signals at respective frequencies for the projectile circuitry assembly 216. While the antenna circuitry portion 218 includes various circuitry for functionality of communication and antenna operation, in various embodiments, the antenna circuitry portion 218 can additionally or optionally include various other kinds of projectile control circuitry, such as sensing components, processing components, fuzing, or other electronic components.

In various embodiments, the circuitry is distributed among one or more interconnected circuit boards 222. Described further below, in various embodiments the one or more boards 222 are interconnected via an integrated flex-line 224. As used herein, flex-line 224 refers to a signal conducting portion of the assembly that is configured to connect the various portions of the assembly and is flexibly bendable to allow for folding or positioning of the various elements of the assembly into a compact shape for insertion into a projectile chassis.

In such embodiments, the boards 222 and flex-line 224 are formed from a single piece of material, including various layers that are selectively etched or removed to define the board portions of the circuitry portion 218 and the flex-line interconnects. Similarly, and described further below, the wrap antenna portion 220 is comprised of one or more antenna elements that are defined on an antenna substrate layer. In some embodiments, the antenna can be deposited by 3D printing or other metal deposition methods In various embodiments, the main body portion 204 has a cylindrical shape or a generally cylindrical shape defined by the chassis 214 and has an exterior surface 232, a forward portion 236 and a rearward portion 240. In some embodiments, chassis 214 defines one or more tapered portions that converge in a direction along a central axis 244. For example, in some embodiments a first portion, such as the forward portion 236 converges in a forward direction, along central axis 244, towards the nose portion 212. In some embodiments, a second portion, such as the rearward portion 240 could converge in a rearward direction towards the tail portion 108. The chassis 214 is, in some embodiments, machined or formed from a single block of metal. However, in certain embodiments the chassis 214 can include a plurality of pieces that are fastened, screwed, or otherwise assembled together.

In various embodiments the chassis 214 defines an antenna recess 250 in the main body portion 204. Described further below, in one or more embodiments the wrap antenna portion 220 of the projectile circuitry assembly 216 is placed or mounted within the antenna recess 250. Depicted at least in FIG. 2C, the antenna portion 220 at least partially fills the recess 250 and leaves a gap or an unfilled portion that is defined between the antenna portion 220 and the exterior 232 of the main body portion 204. In such embodiments, the gap or unfilled portion of the antenna recess 250 defines a buffer space. In various embodiments, when the projectile 200 is fired, the buffer space provides a space between the barrel of a gun and the antenna portion 220 that serves to protect the antenna from damage during projectile firing. In addition, in various embodiments a protective cover 252 can be wrapped over or included with the antenna portion 220 to further protect the antenna portion 220 from damage during projectile firing. In certain embodiments, the protective cover 252 can be deposited onto the antenna 220 by common deposition methods. Depicted in FIGS. 2A and 2B, the protective cover is shown while in FIGS. 2C and 2D the protective cover is removed to reveal the antenna portion 220.

Figure 2A:
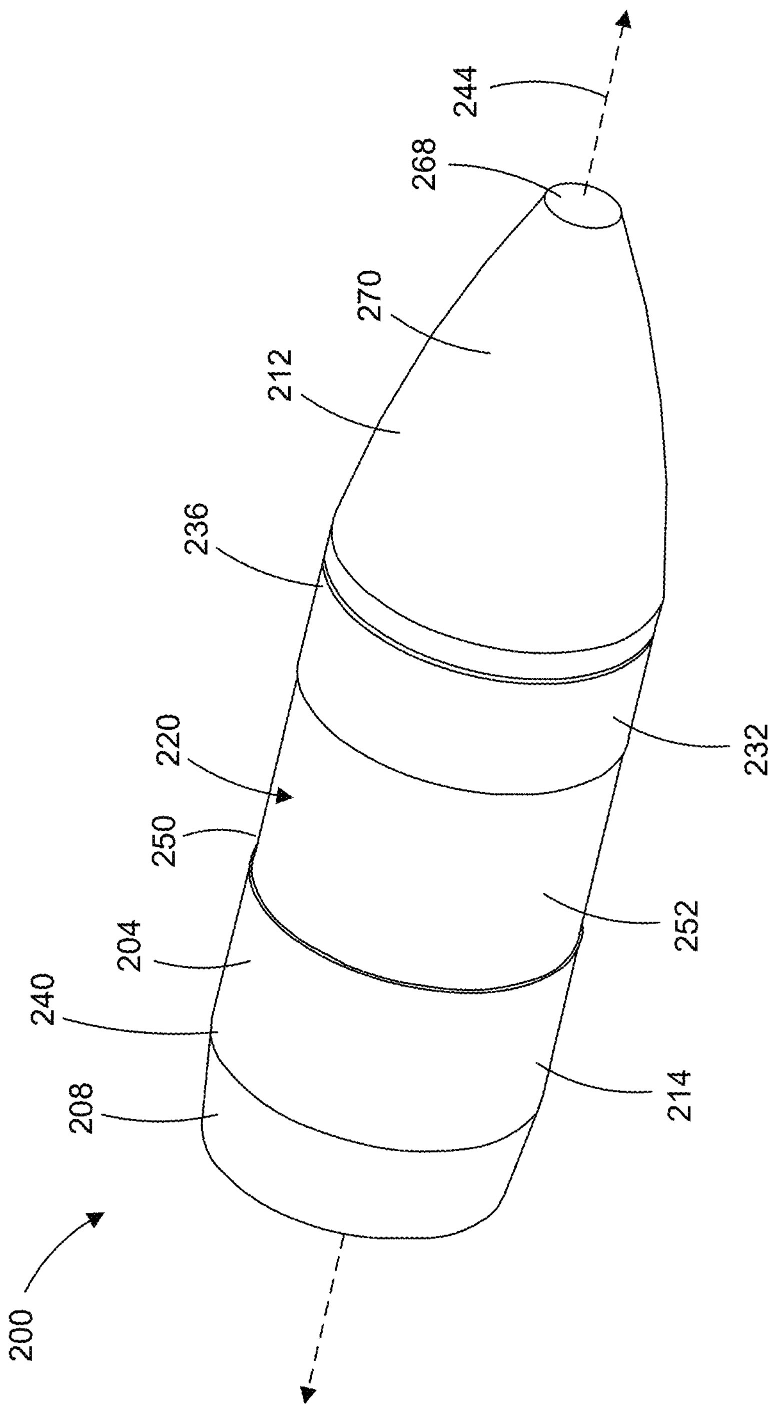
FIGS. 2A-2E depict perspective views, plan views, and partial cross-sectional views of a projectile, according to one or more embodiments of the disclosure.
Figure 2B:
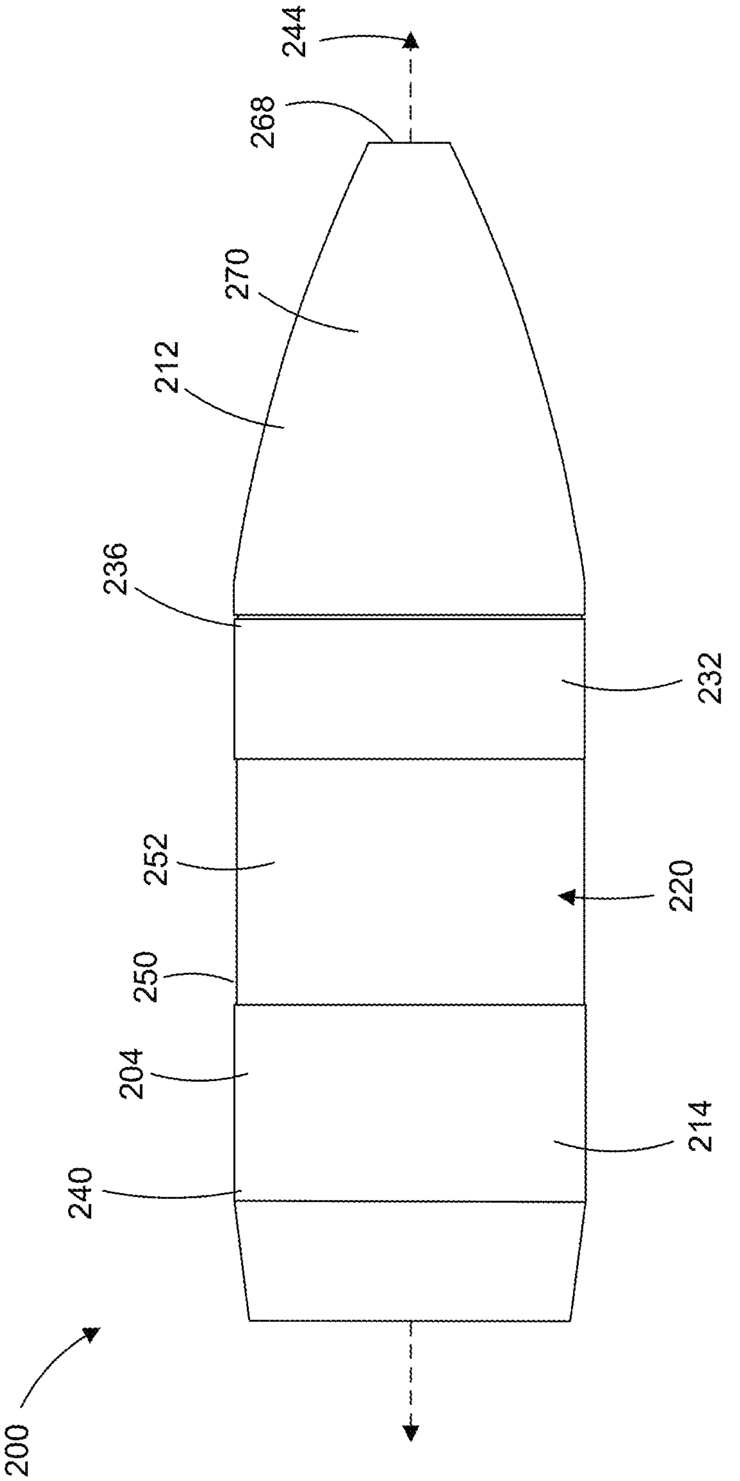
Figure 2C:
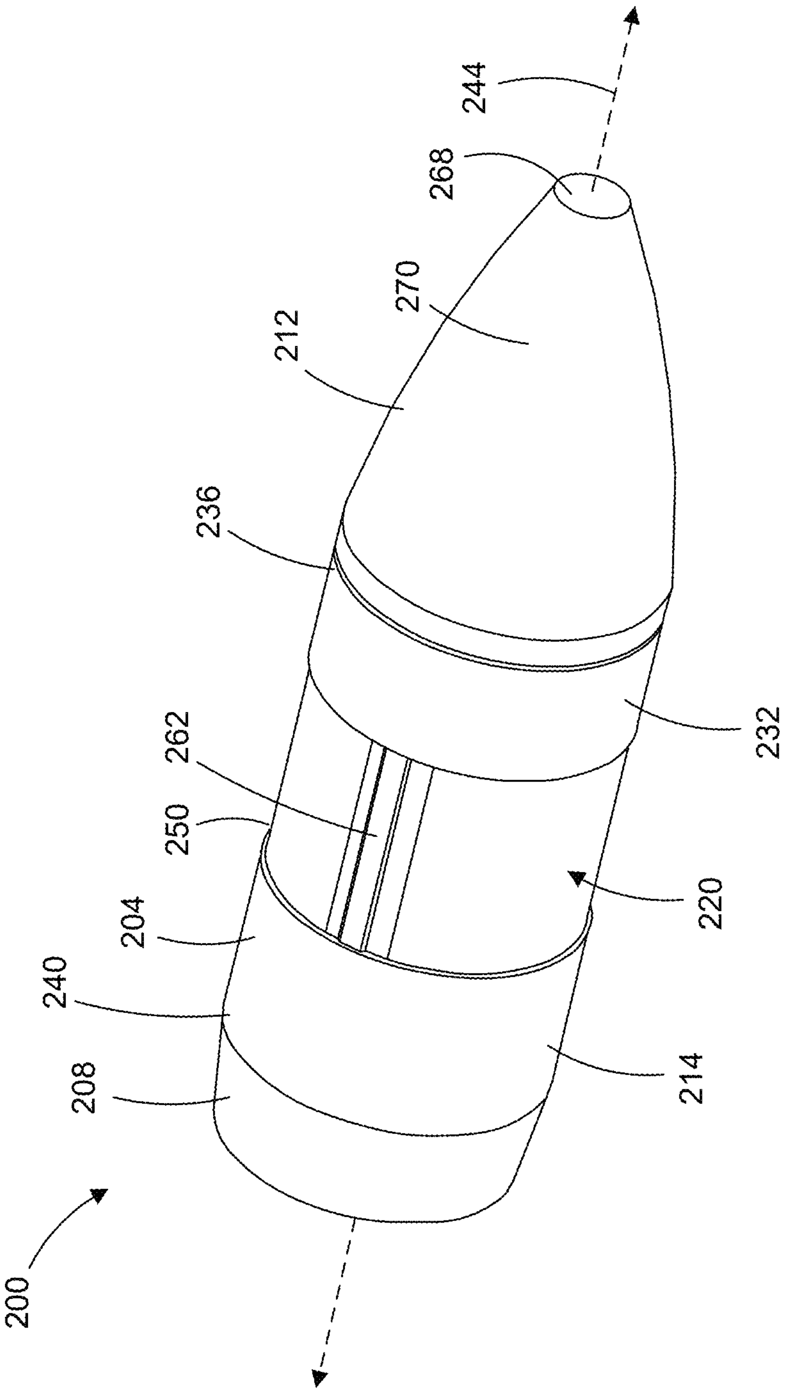
Figure 2D:
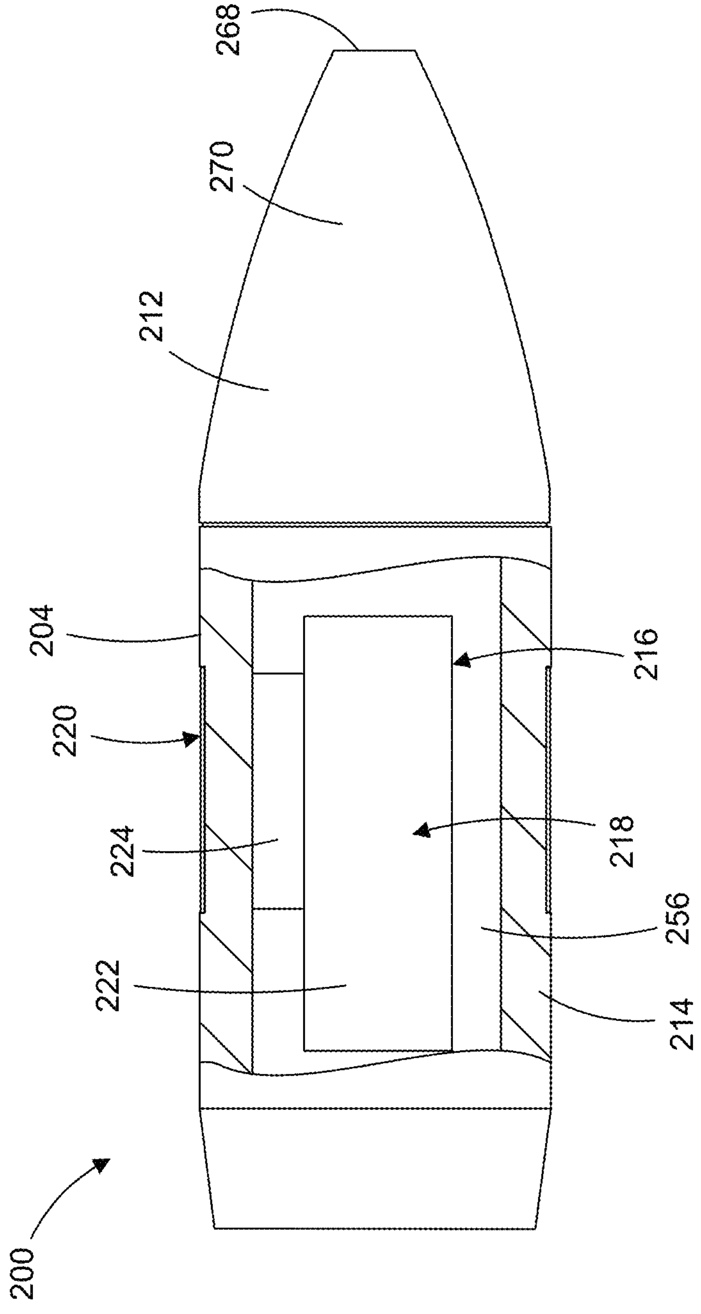
Figure 2E:
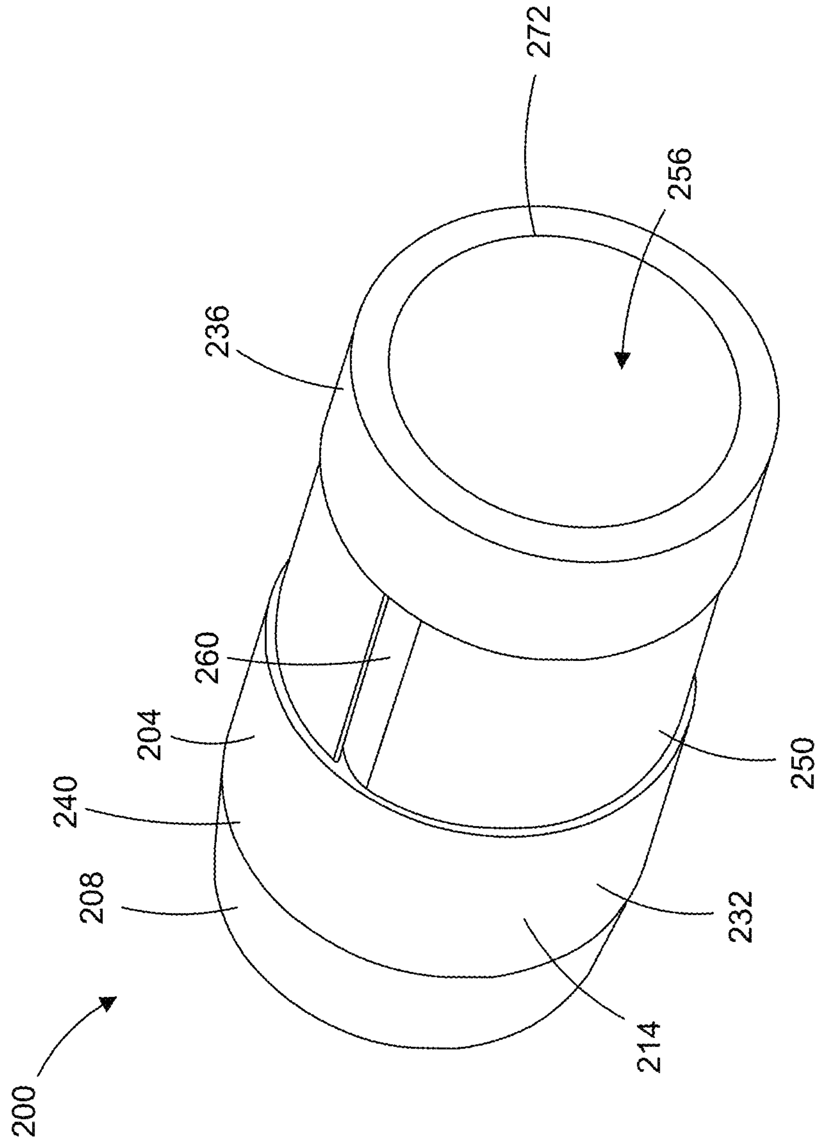

In one or more embodiments the chassis 214 defines a cavity 256 within the projectile 200 for supporting/containing one or more projectile components. As an example, antenna circuitry portion 218 is positioned is depicted in FIG. 2D positioned in cavity 256 of the main body portion 104. As described above, in various embodiments, the antenna circuitry portion 218 can include a variety of projectile control circuitry such as communication componentry, sensing components, processing components, or other components of the projectile 200. In such embodiments, any or all of these components could additionally be positioned in the cavity 256.

In one or more embodiments, the chassis 214 defines an antenna aperture 260 or opening that exposes the interior cavity 256 of the projectile 200 from the antenna recess 250. Described further below, the antenna aperture 260 allows for projectile circuitry assembly 216 to extend between the interior and exterior of the projectile 200, with the wrap antenna portion 220 of the projectile circuitry assembly 216 circumferentially wrapped about the projectile 200 exterior in the antenna recess 250 while also extending through the aperture 260 to connect with the interior antenna circuitry portion 218. Described further below, in one or more embodiments, a sealing material, such as an epoxy filler 262 and/or solder is used to seal the aperture 260 in assembly of the antenna 218 with the projectile chassis 214.

The nose portion 212 is a forward-facing structure and has a tapered or a converging shape. As such, the nose portion 212 extends from the forward portion 236 of the main body portion 204, forwardly, in a first direction, along central axis 244 to a forward tip portion 268. In various embodiments, nose portion 212 has an exterior surface 270 and may be conical or have a curved taper from the forward portion 236 of the main body portion 204 to the forward tip portion 268. In various embodiments, the nose portion 212 is removable from the chassis 214 to reveal or expose an opening 272 into the interior cavity 256 of the projectile 200. Described further below, the opening 272 allows for initial insertion of the projectile circuitry assembly 218, such as during projectile assembly.

In one or more embodiments, the projectile 200 can include one or more flight control portions for directing or otherwise altering the trajectory of the projectile during flight. For example, in certain embodiments, the chassis could define a control support that supports a rotatable collar with one or more aerodynamic features for despinning and/or flight control. In such embodiments, alternator components or other power generation components could additionally be implemented to utilize the spinning collar for power generation/power supply for various electronic projectile components. Examples of power supply and projectile control mechanisms can be found in the various patent applications and/or publications incorporated by reference below.

Figure 3A:
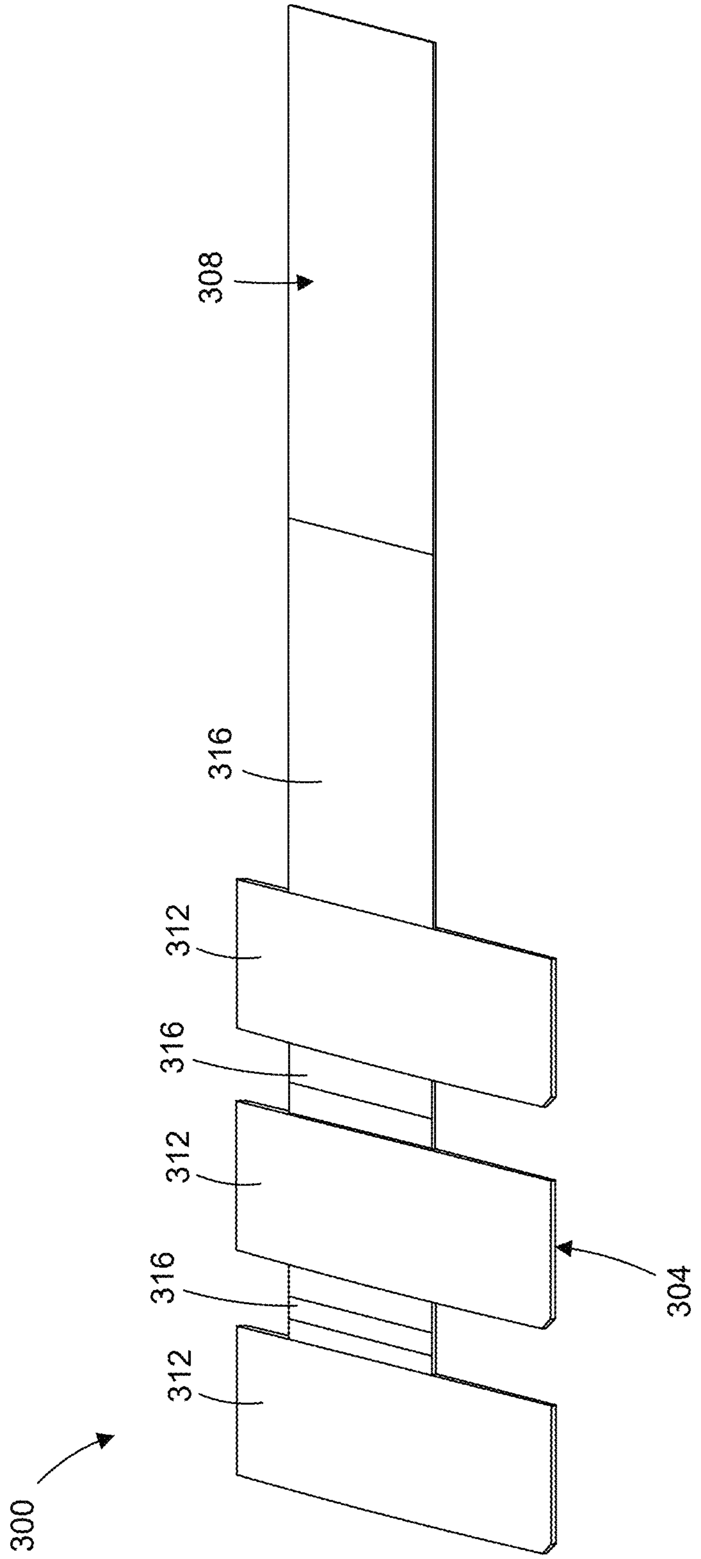
FIGS. 3A-3C depict perspective views of a projectile circuitry assembly in an unfolded and in various compact states for insertion into a projectile chassis, according to one or more embodiments of the disclosure.
Figure 3B:
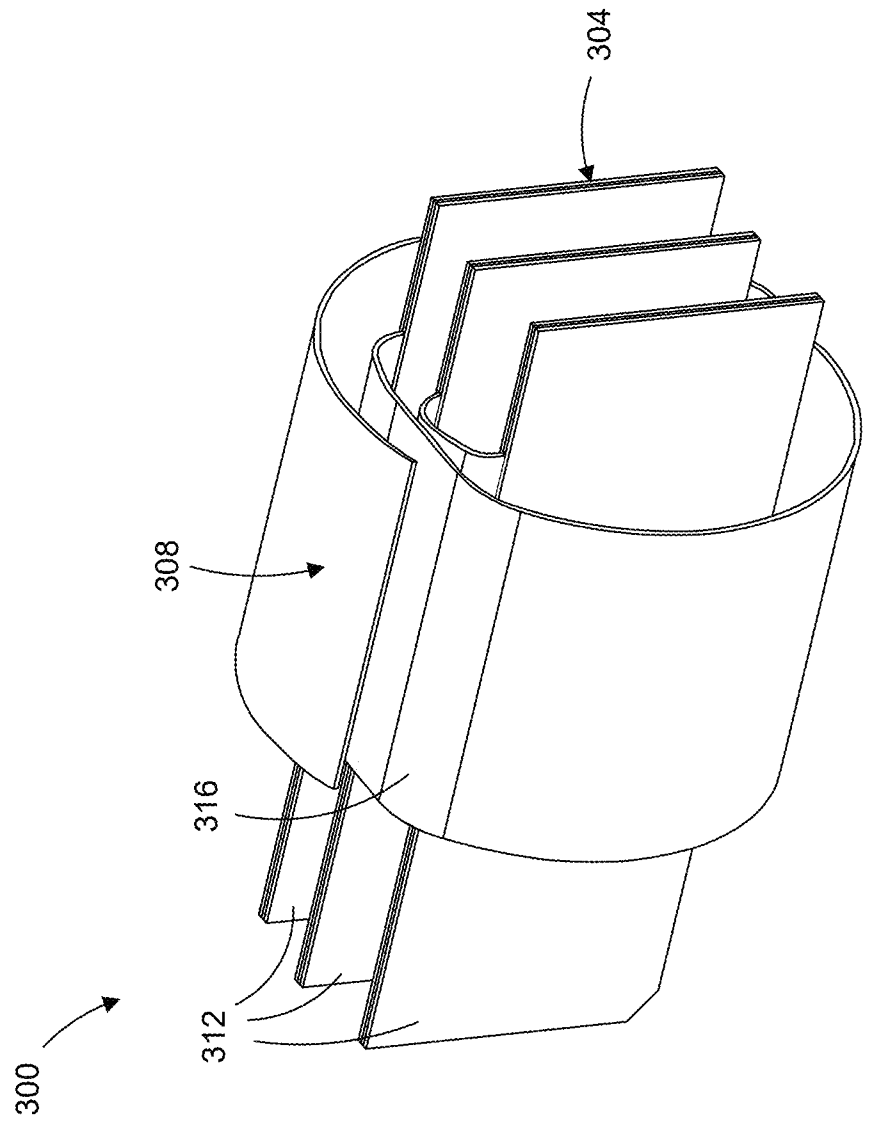
Figure 3C:
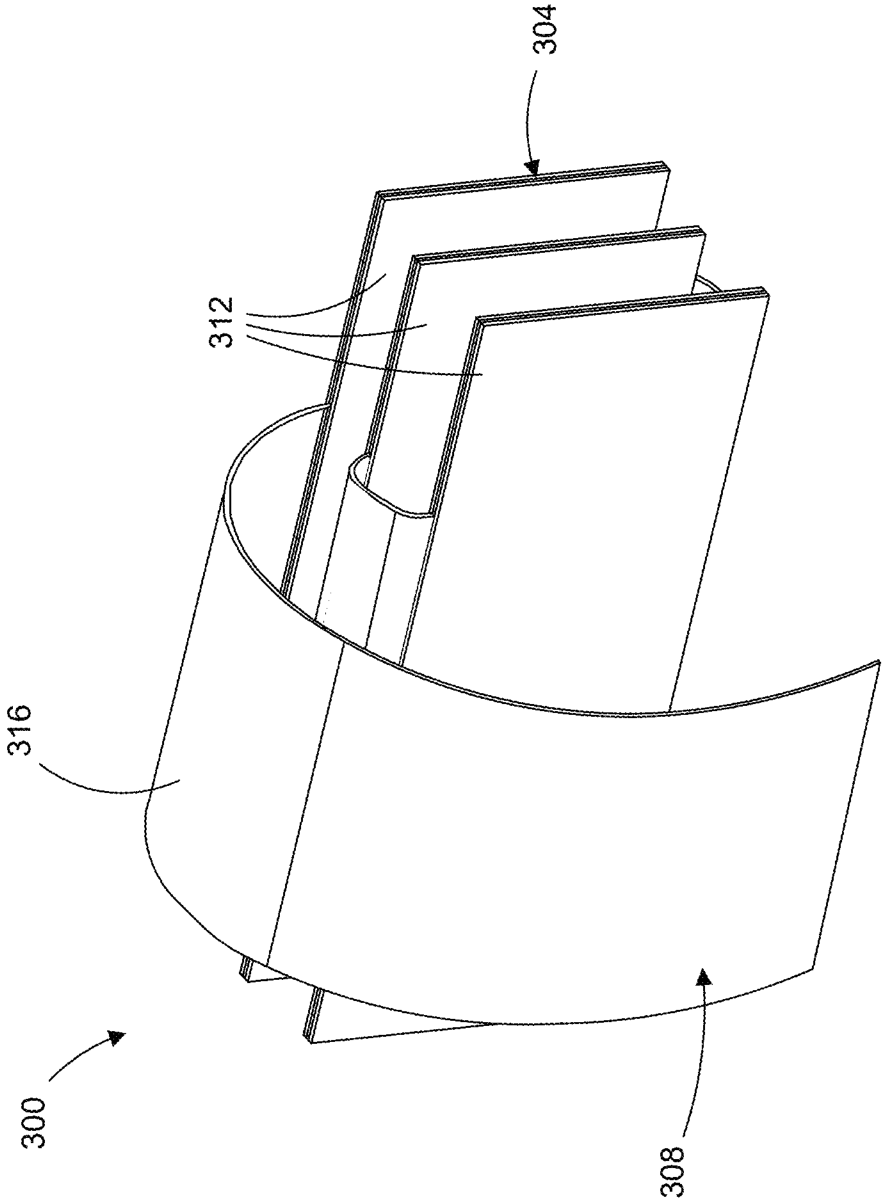

Referring to FIGS. 3A-3C, various perspective views of a projectile circuitry assembly 300 are depicted, according to one or more embodiments. Projectile circuitry assembly 300 is substantially similar to the projectile circuitry assembly 200 described above with references to FIGS. 2A-2E, as such, in various embodiments, the projectile circuitry assembly 300 is a collection of components configured to perform one or more various functions for a projectile including, but not limited to, communication, sensing, proximity detection, and fuzing.

As described above, in various embodiments, the projectile circuitry assembly 300 includes an antenna circuitry portion 304 and a wrap antenna portion 308. In one or more embodiments the antenna circuitry portion 304 includes various antenna circuitry, such as one or more transmitters and receivers, processors, memory, fuzing or other components for executing various projectile functions. In various embodiments, the circuitry is distributed among one or more of a plurality of interconnected circuit boards 312 that are interconnected via an integrated flex-line 316. In such embodiments, the boards 312 and flex-line 316 are formed from a single piece of material, including various layers that are selectively etched or removed to define the boards 312 and the flex-line interconnects 316. Similarly, the wrap antenna portion 308 is comprised of one or more antenna elements that are defined on an antenna substrate layer.

In contrast with the previously utilized implementation of a side-mounted projectile antenna described above with respect to FIG. 1, the projectile circuitry assembly 300 is additionally integrated with the circuitry portion 304 without the use of a separate connector or other device. As such, the projectile circuitry assembly 300 is formed from a unitary piece of material that includes both the circuitry portion 304 and respective antenna portion 308 as a single unitary piece including various layers that are selectively etched or removed to define the antenna element 308 and flex-line interconnect 316. In various embodiments, the integral nature of the assembly 300 allows the device to be easily folded or configured into a compact state, to allow for easy assembly with a projectile chassis without requiring any soldering connections between the various components of the projectile circuitry assembly 300. For example, referring to FIG. 3B, the board is depicted in a first compact state with the flex-line interconnects folded to arrange boards 312 in a stack and antenna portion 308 wrapped around the boards 312 to present a compact footprint for insertion in and assembly with a projectile chassis. Similarly, referring to FIG. 3C, the board is depicted in another compact state with the flex-line interconnects folded to arrange boards 312 in a stack, but without the antenna portion 308 wrapped about the boards. Instead, described further below, the antenna portion 308 is arranged for insertion into a slotted antenna aperture for wrapping about the projectile chassis.

Figure 4A:
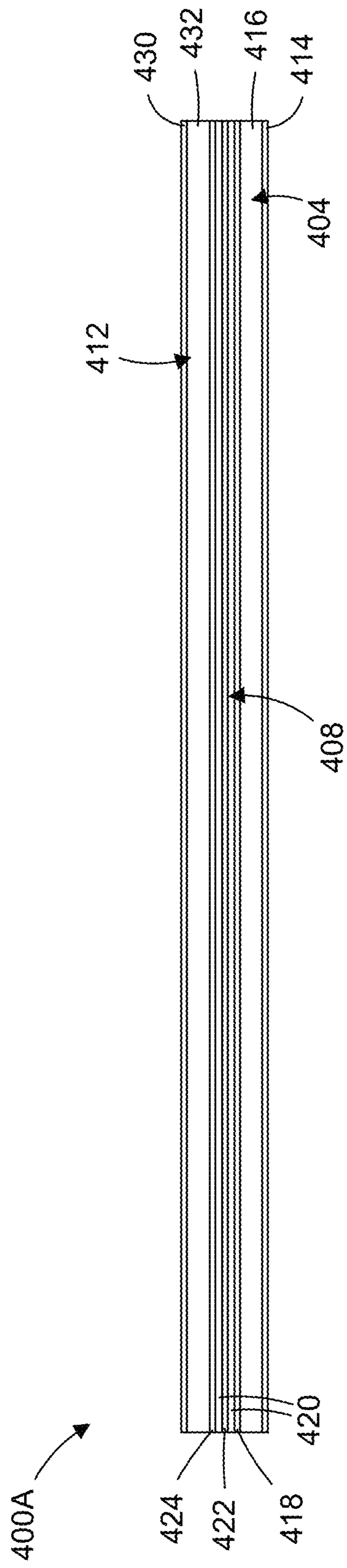
FIGS. 4A & 4B depict side views of a flex-board in stages of manufacture into a projectile circuitry assembly, according to one or more embodiments of the disclosure.
Figure 4B:
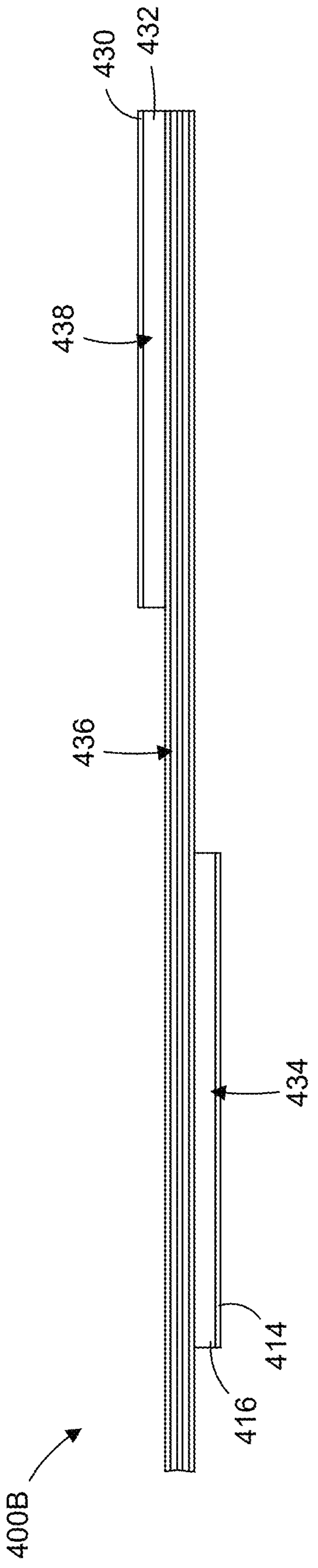

Referring to FIGS. 4A and 4B, side views of a flex-board are depicted in stages of manufacture into a projectile circuitry assembly, according to one or more embodiments. Referring specifically to FIG. 4A a layered flex-board 400A is depicted prior to etching or removal of material to define a projectile circuitry assembly. In one or more embodiments, the board 400A includes a plurality of layers of various types of material. Depicted in FIG. 4A, the flex-board 400A includes nine layers that define at least three distinct board portions including a circuit board portion 404, a flex-line portion 408, and an antenna portion 412. In such embodiments, the board portion 404 can be defined by at least a board ground layer 414, a board substrate layer 416, and a first transition layer 418. In one or more embodiments, the board ground layer 414 functions as a ground for various attached components and may, in various embodiments, include components attached to the layer 414. In one or more embodiments, the board substrate layer 416 functions as a substrate for board components. In various embodiments, the first transition layer 418 is positioned between the board portion 404 and flex-line portion 408 and functions both as a board signal layer and as a ground layer for the bottom of the flex-line portion 408. In such embodiments, the first transition layer 418 can connect various components for signal transfer.

In various embodiments, the flex-line portion 408 can be defined by at least a pair of flex-line substrate layers 420, a flex-line signal layer 422, and the first transition layer 418 and a second transition layer 424. In such embodiments, the flex-line substrate layers 420 function as top and bottom substrates for the flex-line while the signal layer 422 transmits signal lines along the flex-line portion 408. As described above, the first transition layer 418 functions as a ground layer for the bottom of the flex-line portion 408. Similarly, the second transition layer 424 is positioned between the antenna portion 412 and flex-line portion 408. In various embodiments, the second transition layer 424 functions as both an antenna ground layer for the antenna portion 412 or as a flex-line ground layer for the top-side of the flex-line portion 408. In various embodiments, the antenna portion 412 is defined by at least an antenna layer 430, an antenna substrate 432, and the second transition layer 424. In various embodiments, the antenna layer 430 is configured as an antenna, such as a patch antenna, and is configured to transmit/receive an antenna signal. In one or more embodiments, the antenna substrate layer 432 functions as the antenna substrate, and as described above, the second transition layer 424 would function as well as the ground of the antenna portion 412.

Depicted in FIG. 4B, the flex-line board 400A can be machined, etched, cutout, or otherwise formed into a board 400B for the appropriate requirements of the projectile circuitry assembly. Depicted in FIG. 4B, the board 400B now includes a circuit board 434 defined on the far left, a flex-line 436 on either side of the circuit board 434 and connecting the circuit board 434 to an antenna 438 positioned on the right. In this configuration, one or more additional circuit boards 434 could additionally be defined to the left with the flex-line 436 connecting each of the boards, various circuitry on the boards, and the antenna portion 438 together as a unitary device.

Figure 5A:
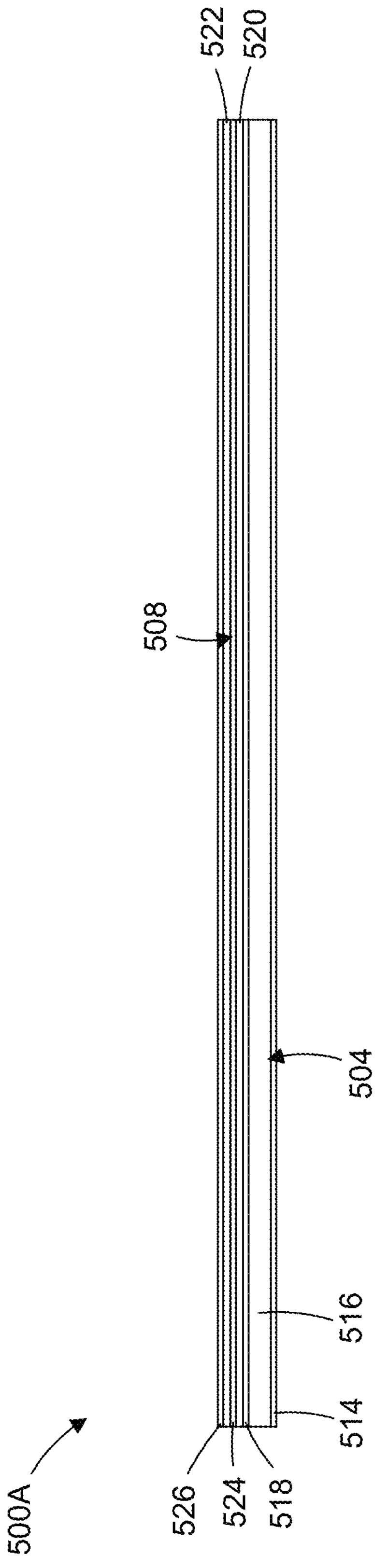
FIGS. 5A & 5B depict side views of a flex-board in stages of manufacture into a projectile circuitry assembly, according to one or more embodiments of the disclosure.
Figure 5B:
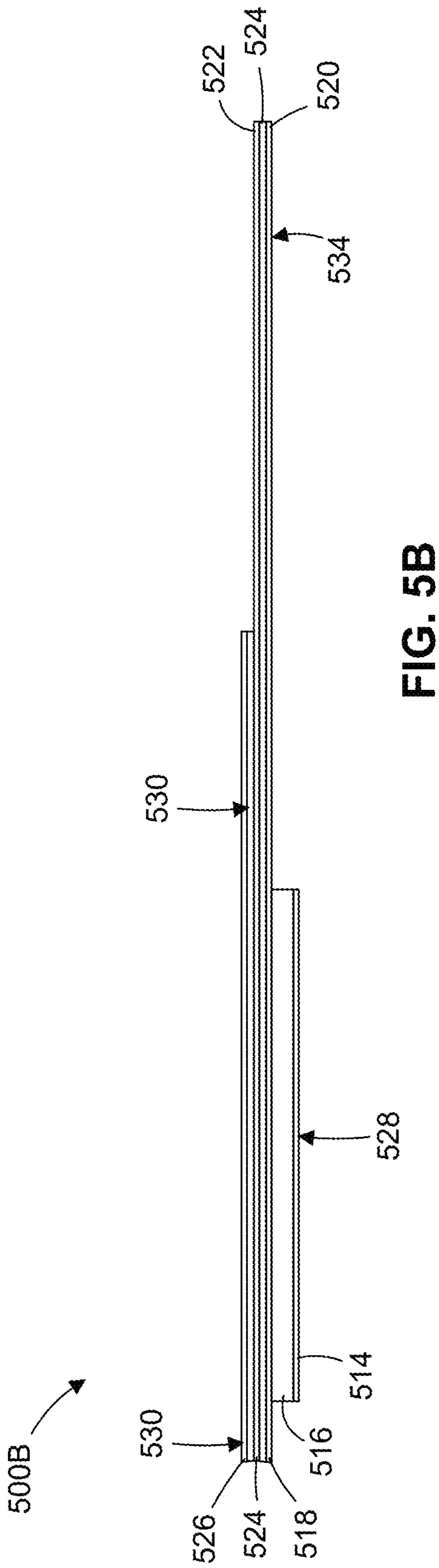

Referring to FIGS. 5A and 5B, side views of a flex-board are depicted in stages of manufacture into a projectile circuitry assembly, according to one or more embodiments. Referring specifically to FIG. 5A a layered flex-board 500A is depicted prior to etching or removal of material to define a projectile circuitry assembly.

In one or more embodiments, the board 500A includes a plurality of layers of various types of material. Depicted in FIG. 5A, the flex-board 500A includes seven layers that define at least two board portions including a circuit board portion 504 and a signal portion 508. In such embodiments, the board portion 504 can be defined by at least a board ground layer 514, a board substrate layer 516, and a first transition layer 518.

In one or more embodiments, the board ground layer 514 functions as a ground for various attached components and may, in various embodiments, include components attached to the layer 514. In one or more embodiments, the board substrate layer 516 functions as a substrate for board components. In various embodiments, the first transition layer 518 is positioned between the board portion 504 and signal portion 508 and functions both as a board signal layer and as a ground layer for the bottom of the flex-line portion 508.

In such embodiments, the first transition layer 518 can connect various components for signal transfer.

In various embodiments, the signal portion 508 can be defined by a pair of substrate layers including a first substrate layer 520, a second substrate layer 522, a signal layer 524, a ground layer 526 and the first transition layer 518. In such embodiments, the signal portion 508, at least based on the etching or machining performed on the flex-line board 500A is configurable to function as either a flex-line 530 or antenna 534. For example, depicted in FIG. 5B, in various embodiments, when configured as a flex-line 530, the first and second substrate layers 520, 522 function as top and bottom substrates while the signal layer 524 functions to transmit signal lines along the flex-line 530. When configured as an antenna 534, in various embodiments the first transition layer 518 functions as a ground layer for the bottom of the antenna 534, the first substrate layer 520 functions as an antenna substrate, and the flex-line signal/antenna layer 524 functions as an antenna, such as a patch antenna, and is configured to transmit/receive an antenna signal.

Depicted in FIG. 5B, the flex-line board 500A can be machined, etched, cutout, or otherwise formed into a board 500B for the appropriate requirements of the projectile circuitry assembly. Depicted in FIG. 5B, the board 500B now includes a circuit board 528 defined on the far left, a flex-line 530 on either side of the circuit board 528 and connecting the circuit board 528 to an antenna 534 positioned on the right. In this configuration, one or more additional circuit boards 528 could additionally be defined to the left with the flex-line 530 connecting each of the boards, various circuitry on the boards, and the antenna portion 534 together as a unitary device.

Referring briefly to FIGS. 4A, 4B, 5A, and 5B, these are just two potential flex-line board configurations of many. In various embodiments, the flex-line boards could include additional or fewer layers, for example based on the needs of the user. Furthermore, depending on what materials are used on the boards, they both could be used for high frequency (more than 15 GHz) or low frequency (less than 15 GHz). In certain embodiments, the flex-line boards will generally be made of a less expensive RF material, such as FR4, which does not perform as well when frequencies get very high. However, this FR4 material could just as easily be replaced with better RF performing substrates, as known in the art, based on the requirements of the board.

Figure 6A:
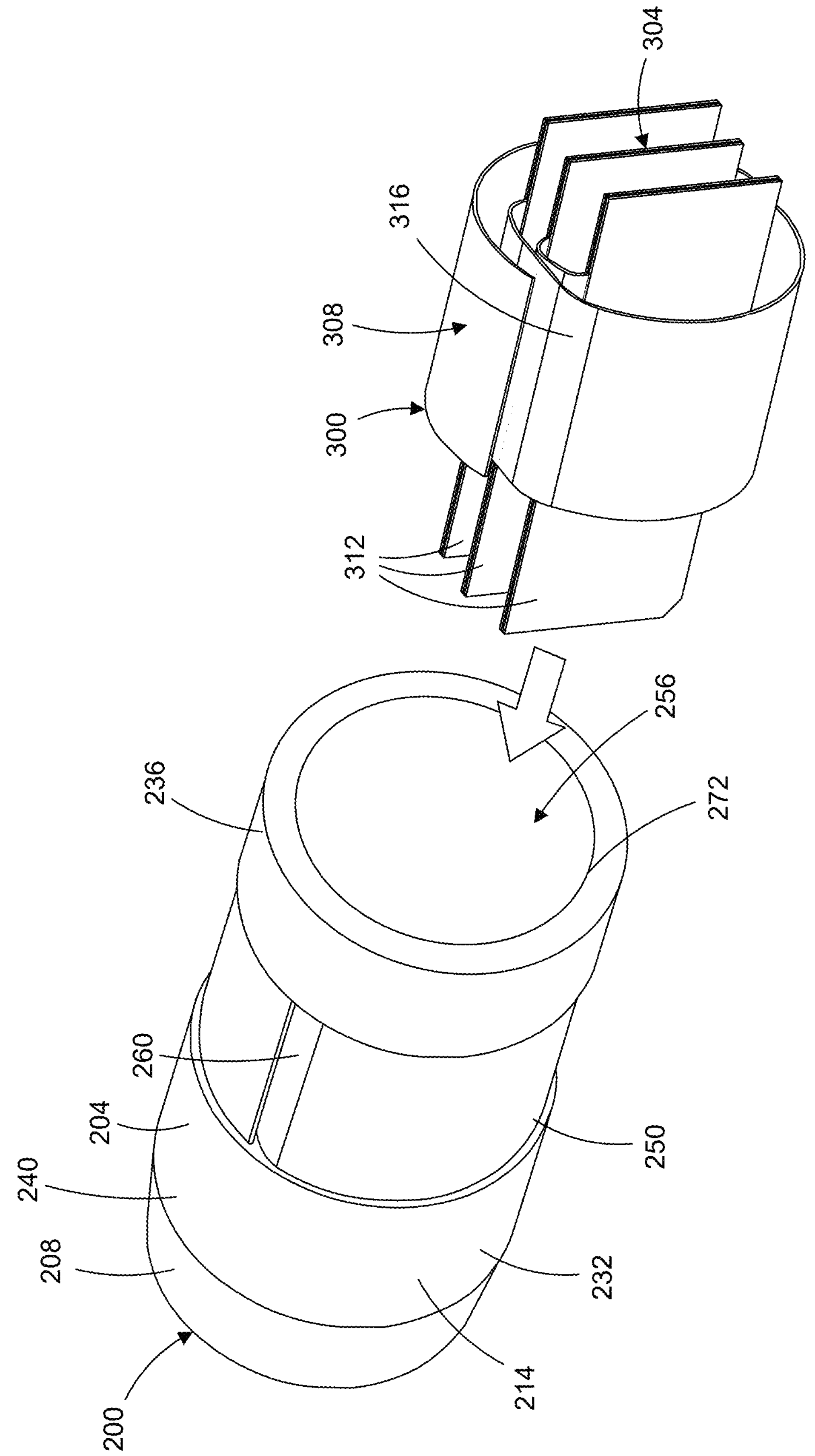
FIGS. 6A-6D depict stages of assembly of a projectile circuitry assembly with a projectile chassis, according to one or more embodiments of the disclosure.

Referring to FIG. 6A-6D, stages of assembly of a projectile circuitry assembly 300 with a projectile chassis 214 is depicted, according to one or more embodiments. In one or more embodiments, the projectile circuitry assembly 300 is configured in a compact state with the boards 312 arranged together in a stack and antenna portion 308 wrapped around the boards 312 to present a compact footprint for insertion and assembly with a projectile chassis 214. As described above, in one or more embodiments the chassis 214 defines a cavity 256 within the projectile 200 for supporting one or more projectile components. In various embodiments, an opening 272 into the interior cavity 256 is defined at a forward portion 236 of the chassis 214. Referring specifically to FIG. 6A, in a first stage of assembly the opening 272 allows for initial insertion of the folded projectile circuitry assembly 300 into the interior of the projectile 200. As described above, in one or more embodiments, the chassis 214 defines an antenna aperture 260 or opening that exposes the interior cavity 256 of the projectile 200 from the antenna recess 256. In such embodiments the antenna aperture 260 allows for projectile circuitry assembly 300 to extend between the interior and exterior of the projectile 200, with the wrap antenna portion 308 of the projectile circuitry assembly 300 circumferentially wrapped about the projectile 200 exterior in the antenna recess 250 while also extending through the aperture 260 to connect with the interior antenna circuitry.

Figure 6B:
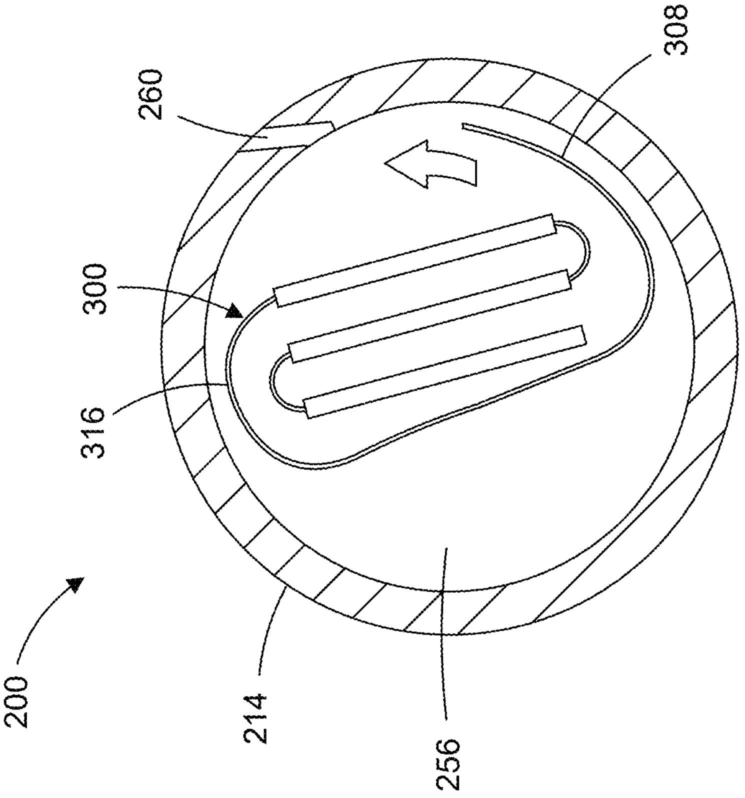
Figure 6C:
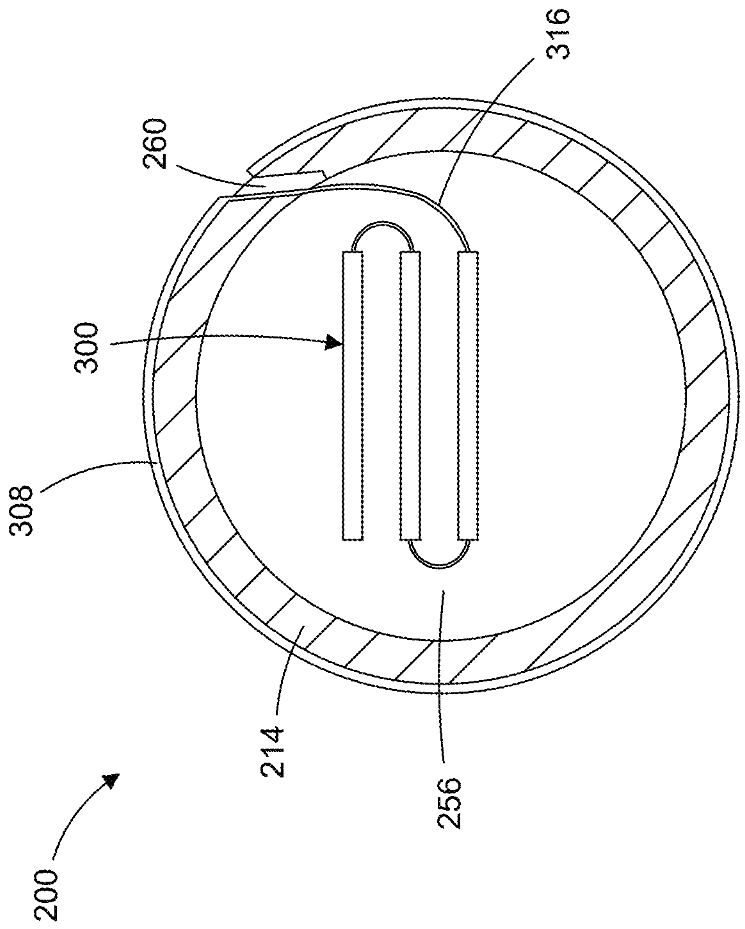

Referring specifically to FIG. 6B, a second stage of assembly is depicted, according to various embodiments. As shown, once inserted, the projectile circuitry assembly 300, with antenna portion 308 wrapped around the boards 312, is rotated to thread the antenna portion 308 of the assembly 300 through the aperture 260. As seen in FIG. 6C, the projectile circuitry assembly 300 is rotated to thread the antenna portion 308 through the aperture 260 and wrap the projectile circuitry assembly 308 about the exterior of the chassis 214.

Figure 6D:
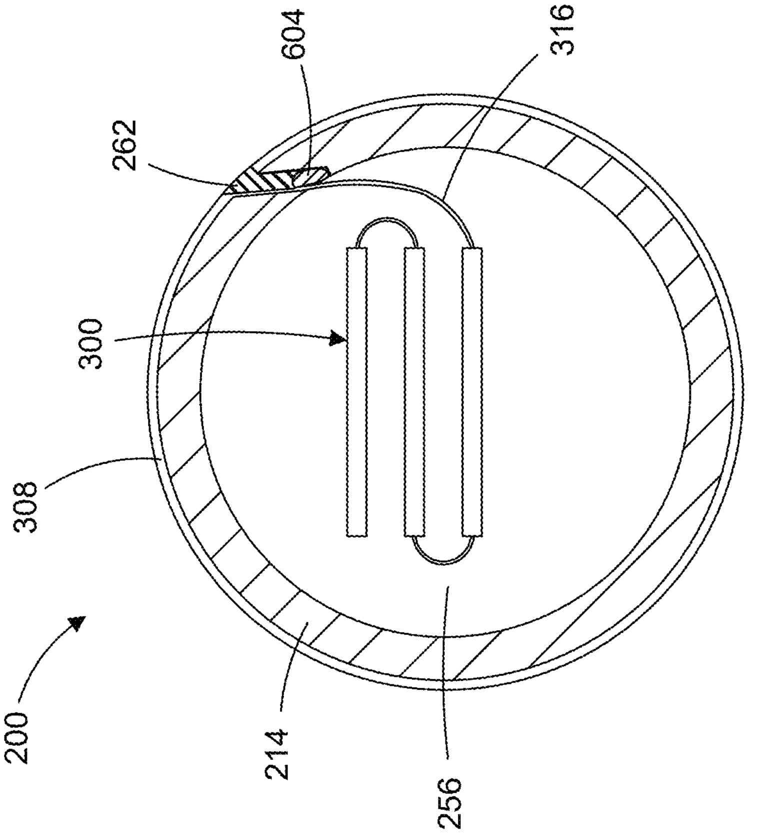

Referring specifically to FIG. 6D, in one or more embodiments, a sealing material, such as an epoxy filler 262 and/or solder 604 is used to seal or otherwise fill the aperture 260 in assembly of the antenna 218 with the projectile chassis 214. In various embodiments, the solder 604 encloses the one or more circuit boards in the projectile interior and isolates the one or more circuit boards from exterior electromagnetic fields.

Figure 7:
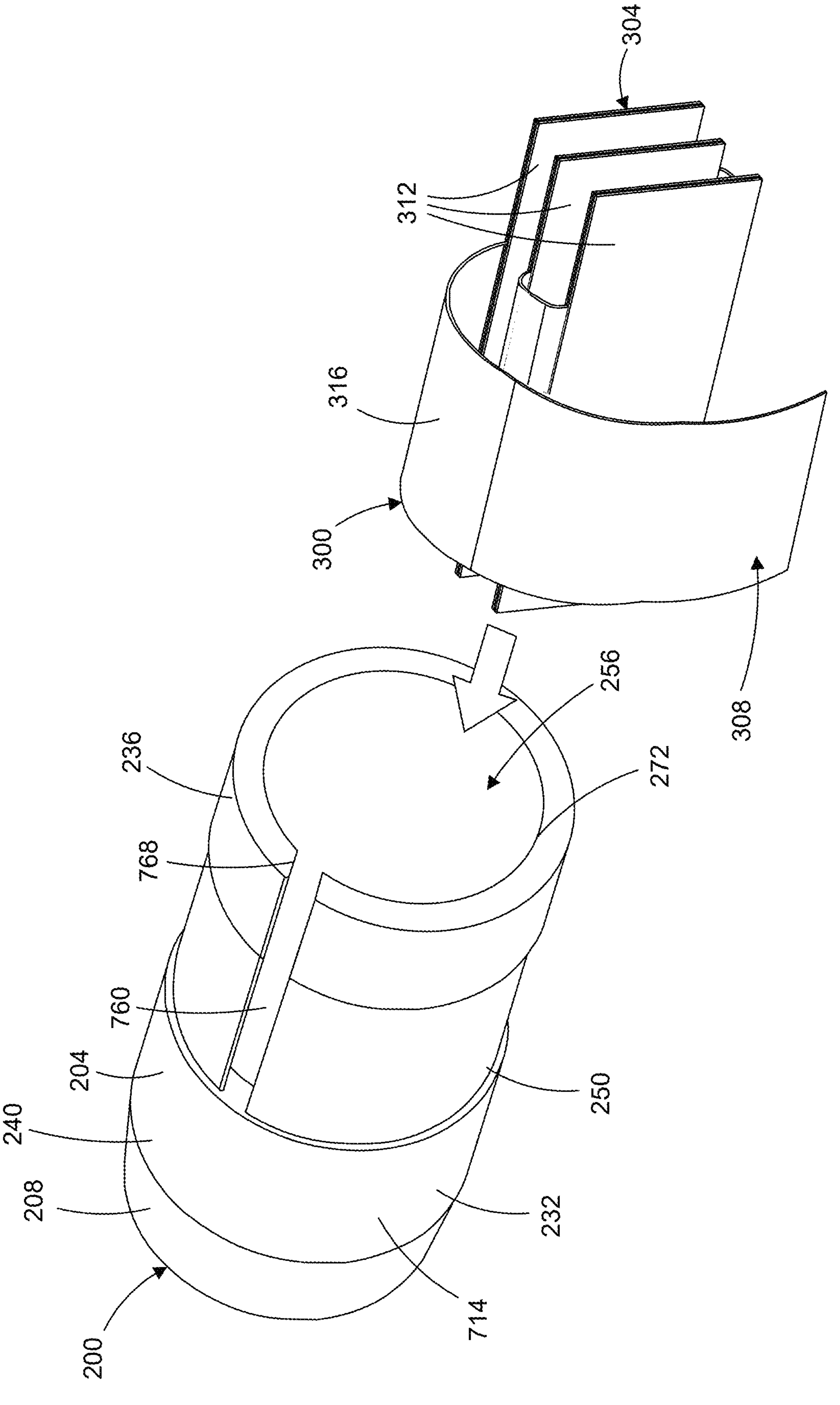
FIG. 7 depicts assembly of a projectile circuitry assembly with a projectile chassis, according to one or more embodiments of the disclosure.

Referring to FIG. 7, stages of assembly of a projectile circuitry assembly 300 with a projectile chassis 714 is depicted, according to one or more embodiments. In one or more embodiments, the projectile circuitry assembly 300 is configured in a compact state with the boards 312 arranged together in a stack and antenna portion 308 wrapped around the boards 312 to present a compact footprint for insertion and assembly with a projectile chassis 714. As described above, in one or more embodiments the chassis 714 defines a cavity 256 within the projectile 200 for supporting one or more projectile components. In various embodiments, an opening 272 into the interior cavity 256 is defined at a forward portion 236 of the chassis 714.

In a first stage of assembly the opening 272 allows for initial insertion of the folded projectile circuitry assembly 300 into the interior of the projectile 200. As described above, in one or more embodiments, the chassis 714 defines an antenna aperture 760 or opening that exposes the interior cavity 256 of the projectile 200 from the antenna recess 256. Depicted in FIG. 7, the antenna aperture 760 is slotted, defining a forward opening 768 that allows for insertion of the antenna portion 308 without requiring the wrapping and rotation of the antenna assembly, described above. In such embodiments the antenna aperture 760 allows for projectile circuitry assembly 300 to extend between the interior and exterior of the projectile 200, as described above.

Figure 8A:
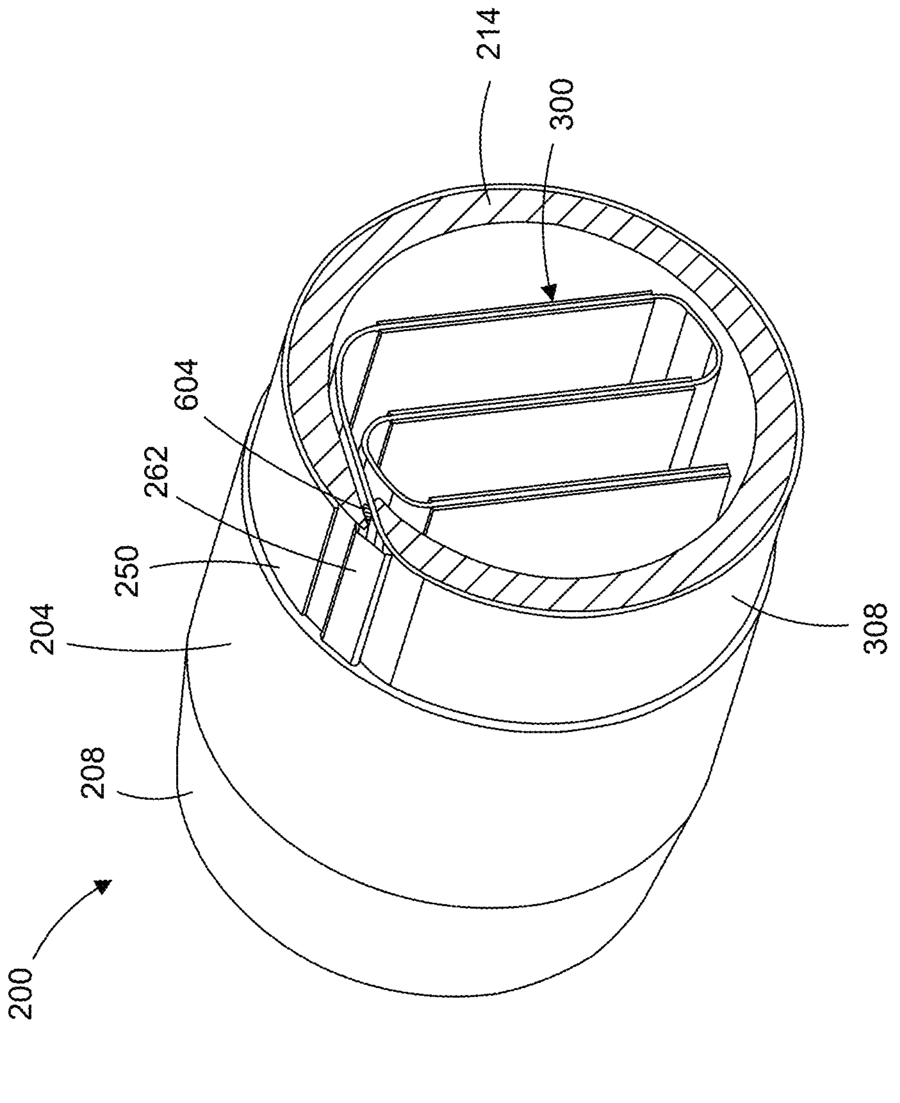
FIGS. 8A & 8B depict an assembled projectile chassis and projectile circuitry assembly, according to one or more embodiments of the disclosure.
Figure 8B:
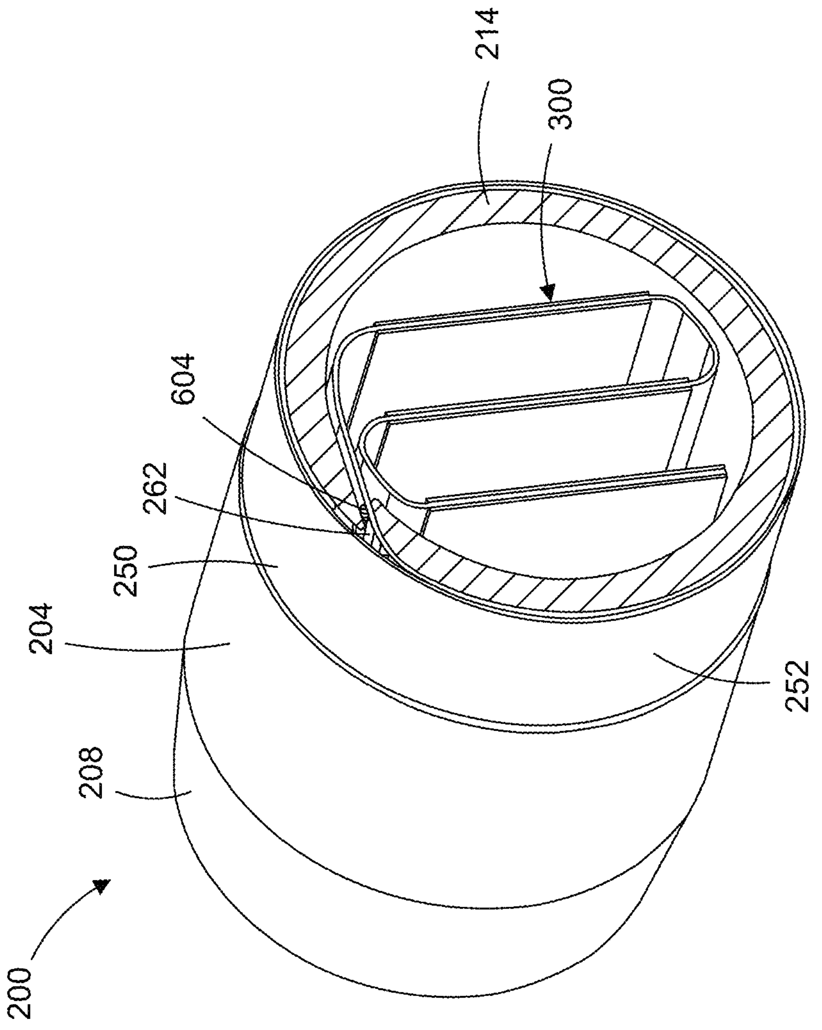

The result of assembly is depicted in FIGS. 8A & 8B, as described above, in various embodiments, once the antenna portion 308 is inserted and threaded through and secured in place, a protective layer 252 can be added to protect the antenna from damage during projectile firing. In various embodiments a protective cover 252 can be wrapped over or included with the antenna portion 220 to further protect the antenna portion 220 from damage during projectile firing In addition to the above disclosure, the disclosure of U.S. Pat. No. 6,981,672, which is owned by the owner of this application, is fully incorporated by reference herein for all purposes. Also incorporated herein for all purposes, in their entireties are: U.S. Pat. Nos. 6,422,507; 7,412,930; 7,431,237; 6,345,785; 8,916,810; 6,653,972; 7,631,833; 7,947,936; 8,063,347; 9,709,372; 9,683,814; 8,552,349; 8,757,064; 8,508,404; 7,849,797; 7,548,202; 7,098,841; 6,834,591; 6,389,974; 6,204,8015,734,389; 5,696,347; 9,709,372;

9,683,814; 9,031,725; 8,552,349; 8,757,064; 8,508,404; 7,849,797; 7,548,202; 7,098,841; 6,834,591; 6,389,974; 6,204,801; 5,734,389; 5,696,347; 6,502,786; 6,666,402; 6,693,592; 7,681,504; 8,319,163; 8,324,542; 8,674,277; 8,950,335; 9,303,964; 9,360,286; 9,557,405; 9,587,923; 10,054,404; 2006/0061949; 2018/0245895; and 2019/0041527.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A projectile having a nose portion with a forward tip, a body portion, a tail portion, and a central axis, the projectile comprising:

a chassis extending from the tail portion to the nose portion, the chassis defining a generally cylindrical wall of the body portion and further defining an interior cavity within the projectile and further defining an antenna aperture through the cylindrical wall of the body portion;

a projectile circuitry assembly comprising one or more circuit boards and a wrap antenna, the one or more circuit boards and the wrap antenna interconnected via an integrated flex-line, the wrap antenna comprising one or more antenna elements that are defined on a flexible antenna substrate layer, wherein the one or more circuit boards are positioned in the interior cavity and at least a portion of the wrap antenna projects through the antenna aperture and is wrapped circumferentially about an exterior of the cylindrical wall of the body portion; and a sealing material sealing the antenna aperture.

2. The projectile of claim 1, wherein the projectile circuitry assembly comprises: a board ground layer, a board substrate layer, a first transition layer, a first flex-line substrate layer, a flex-line signal layer, a second flex-line substrate layer, a second transition layer, an antenna substrate layer, and an antenna signal layer.

3. The projectile of claim 2, wherein the projectile circuitry assembly is a flex-line board comprising: a circuit board portion, a flex-line portion, and an antenna portion, the circuit board portion defined by the board ground layer, the board substrate layer, and the first transition layer, the flex-line portion defined by the first transition layer, the first and second substrate layers, the flex-line signal layer, and the second transition layer, and the antenna portion defined by the second transition layer, the antenna substrate layer, and the antenna signal layer.

4. The projectile of claim 1, wherein the projectile circuitry assembly is a flex-line board comprising: a board ground layer, a board substrate layer, a first transition layer, a first substrate layer, a second substrate layer, a signal layer, and a ground layer.

5. The projectile of claim 4, wherein the projectile circuitry assembly comprises a circuit board portion and a signal portion, the circuit board portion defined by at least a board ground layer, a board substrate layer, and the first transition layer, and the signal portion defined by the first substrate layer, second substrate layer, the signal layer, the ground layer, and the first transition layer.

6. The projectile of claim 5, wherein the signal portion, is configurable to function as either a flex-line or an antenna.

7. The projectile of claim 1, wherein the generally cylindrical wall of the body portion defines an antenna recess in the main body portion; and wherein the antenna portion is mounted within the antenna recess such that the antenna portion partially fills the recess and leaves an unfilled portion between an exterior of the antenna recess and an exterior of the cylindrical wall.

8. The projectile of claim 1, wherein the wrap antenna further comprises a protective cover.

9. The projectile of claim 1, wherein the one or more circuit boards define an antenna circuitry portion, wherein the antenna circuitry portion includes one or more projectile control circuitry comprising sensing components, processing components, baseband processing components, and fuzing.

10. The projectile of claim 1, wherein the sealing material comprises an epoxy.

11. The projectile of claim 1, wherein the sealing material comprises a solder bead.

12. The projectile of claim 11, wherein the solder bead encloses the one or more circuit boards in the projectile interior and isolates the one or more circuit boards from exterior electromagnetic fields.

13. A method of assembling a projectile and a projectile circuitry assembly, the projectile comprising a chassis extending from a tail portion to a nose portion, the chassis defining a generally cylindrical wall of a main body portion and further defining an interior cavity within the projectile for containing one or more projectile components and further defining an antenna aperture slot extending axially through the cylindrical wall of the body portion exposing the interior cavity, and the projectile circuitry assembly comprising one or more circuit boards and a wrap antenna, the one or more circuit boards and the wrap antenna interconnected via an integrated flex-line to define a unitary device, the wrap antenna comprising one or more antenna elements that are defined on a flexible antenna substrate layer, wherein the method comprises:

configuring the projectile circuitry assembly into a compact state such that the plurality of circuit boards are insertable into the interior cavity;

disposing the antenna to extend through the antenna aperture slot;

wrapping the antenna of the projectile circuitry assembly about the exterior of the chassis; and sealing the antenna aperture slot with a sealing material.

14. The method of claim 13, wherein in the compact state the integrated flex-line is folded to arrange the one or more circuit boards together in a stack with the antenna portion wrapped around the one or more circuit boards.

15. The method of claim 13, wherein the generally cylindrical wall of the body portion defines an antenna recess in the main body portion; and wherein the antenna is wrapped within the antenna recess such that the antenna portion partially fills the recess and leaves an unfilled portion between an exterior of the antenna recess and an exterior of the cylindrical wall.

16. The method of claim 13, wherein the sealing material comprises an epoxy.

17. The method of claim 13, wherein the sealing material comprises a solder bead.

18. The method of claim 17, wherein the solder bead encloses the one or more circuit boards in the projectile interior and isolates the one or more circuit boards from exterior electromagnetic fields.

19. The method of claim 13, wherein the antenna aperture slot defines a forward opening at the opening into the interior cavity.

20. The method of claim 19, wherein the wrap antenna is inserted at the forward opening of the antenna aperture slot.

* * * * *